United States Patent [19]

Clevenger

[11] Patent Number: 5,233,824
[45] Date of Patent: Aug. 10, 1993

[54] TURBINE ENGINE INTERSTAGE SEAL

[75] Inventor: Lloyd L. Clevenger, Phoenix, Ariz.

[73] Assignee: Allied-Signal Inc., Morris Township, Morris County, N.J.

[21] Appl. No.: 595,158

[22] Filed: Oct. 10, 1990

[51] Int. Cl.$^5$ .............................................. F02C 3/00
[52] U.S. Cl. ................................ 60/39.75; 415/174.2; 415/174.3; 415/178
[58] Field of Search ..................... 60/39.75, 39.36, 760; 415/170.1, 177, 178, 174.2, 174.3; 417/407

[56] References Cited

U.S. PATENT DOCUMENTS

| | | |
|---|---|---|
| 1,400,323 | 12/1921 | Sherbondy . |
| 2,013,499 | 9/1935 | Meckenstock . |
| 2,938,659 | 5/1960 | Judson et al. ........................ 415/177 |
| 3,046,648 | 7/1962 | Kelly . |
| 3,116,908 | 1/1964 | Wosika ............................... 60/39.36 |
| 3,263,424 | 8/1966 | Birmann . |
| 3,548,565 | 12/1970 | Toesca ............................... 60/39.36 |
| 3,613,360 | 10/1971 | Howes ............................... 60/39.36 |
| 3,623,318 | 11/1971 | Shank ............................... 60/39.75 |
| 3,647,311 | 3/1972 | Wooton et al. . |
| 4,087,199 | 5/1978 | Hemsworth et al. . |
| 4,122,673 | 10/1978 | Leins ................................... 417/407 |
| 4,135,851 | 1/1979 | Bill et al. . |
| 4,296,937 | 10/1981 | Handa . |
| 4,449,714 | 5/1984 | Meier . |
| 4,725,206 | 2/1988 | Glaser et al. ........................ 417/407 |
| 4,932,207 | 6/1990 | Harris et al. ............................ 60/760 |
| 5,033,263 | 7/1991 | Shekleton et al. ................. 60/39.36 |
| 5,074,111 | 12/1992 | Harris et al. . |

FOREIGN PATENT DOCUMENTS 762097 5/1954 Fed. Rep. of Germany .
PCT/US89/-
05274 11/1989 PCT Int'l Appl. .

Primary Examiner—Richard A. Bertsch
Assistant Examiner—Michael I. Kocharov
Attorney, Agent, or Firm—Terry L. Miller; Jerry J. Holden; Robert A. Walsh

[57] ABSTRACT

A turbine engine includes adjacent compressor and turbine sections and an interstage seal assembly interposing therebetween in cooperation with a rotor assembly of the engine to inhibit leakage of pressurized air between the sections. The interstage seal assembly includes an annular wall portions at its outer perimeter cooperating with a housing of the engine and at its inner perimeter sealingly cooperating with the rotor assembly. The wall portions of the interstage seal includes nested conical sections of opposite axial dispositions which cooperatively resist both thermal and pressure differential induced distortion of the seal assembly.

7 Claims, 3 Drawing Sheets

TURBINE ENGINE INTERSTAGE SEAL

The U.S. Government has rights in this invention pursuant to contact No. DAAJ02-86-C-0006 issued by the United States Army.

BACKGROUND OF THE INVENTION

The present invention is in the field of sealing apparatus and method for use in a turbine engine. More particularly the present invention relates to a seal structure employed in a turbine engine wherein the engine includes a centrifugal compressor receiving ambient air and pressurizing this ambient air for delivery to a combustor and a turbine disposed in back-to-back relationship with the compressor and receiving combustion products formed by combustion of a fuel in the pressurized air supplied by the compressor. Historically such turbine engines have employed a disk-like centrifugal compressor rotor and a similar disk-like radial inflow turbine disposed in back-to-back relationships such that they cooperatively define therebetween a radially inwardly extending annular groove. At the radially inner extent of the annular groove the turbine and compressor rotors cooperatively carry a seal runner, or centering ring, which served as a concentricity maintaining structure with respect to the turbine and compressor rotors respectively.

A housing structure of the turbine engine conventionally carries a disk-like annular seal member extending radially inwardly into the annular groove between the compressor rotor and turbine rotor, and at its radially inner extent carrying a seal structure. The seal structure may be, perhaps, of a labyrinth type, sealingly engaging the seal runner which is carried cooperatively by the compressor rotor and turbine rotor. Generally speaking, these conventional seal structures were made of sheet metal stampings of comparatively light gage and have been subject to a variety of shortcomings because of their structural nature.

By way of example, the annular sealing structure is subjected to an axial force because of the fluid pressure differential thereacross existing between the discharge of the centrifugal compressor and the inlet pressure at the radial inflow turbine. This pressure differential causes the relatively flexible conventional sheet metal seal structure to be displaced axially in a direction towards the turbine rotor. Additionally the seal structure is subjected to a radial temperature differential resulting from the flow of hot gasses radially inwardly and across the turbine rotor. The hot gas flow provides a heating input to the annular seal structure which is most pronounced at its radially outer extent and decreases progressively radially inwardly therefrom. On the other hand the seal structure is subjected to a comparative cooling effect on the compressor side thereof as a result of the small portion of compressor discharge airflow which circulates in the backspace between the compressor rotor and the adjacent face of the annular seal structure. Because of this differential radial heating and cooling on opposite faces of the seal structure, conventional seal structures have displayed a warping or buckling similar to that experienced with the bottom of a frying pan which is heated most intensely in the center and is cooler at its outer periphery.

Such seal structures, due to this differential thermal expansion experienced in the radial direction of the structure, will in one location warp in one axial direction and in an adjacent location may warp or displace in the opposite axial direction. In the case of the conventional annular seal structure such warping and displacements superimposed upon the axial displacements which resulted from differential pressures across the seal structure results in axial as well as radial movements at the center opening of the seal structure whereat sealing integrity is to be maintained.

Further, the heat input to the seal structure may be circumferentially nonuniform. Thus, the seal structure will have a nonuniform circumferential and radial temperature distribution. This circumferentially nonuniform temperature distribution further contributes to warping of the seal structure. As a result, the labyrinth or other conventional seal structure which is carried at the center opening of the interstage seal is displaced axially as well as radially and sealing integrity is generally not successfully maintained by conventional interstage seals of the type described above.

A result of the axial, radial, and warping displacements experienced by conventional seal structures has been the necessity to provide larger than desired clearances between the turbine back face and the seal structure. Consequently, a portion of the combustion products flowing radially inwardly onto the turbine are lost into the excessive clearance provided at the seal structure. Turbine efficiency is adversely affected by this loss of a portion of the combustion products. Also, the heat input to the seal structure is increased as energy input to and efficiency of the turbine is decreased by excessive seal assembly clearances.

Accordingly, it is an object for the present invention to provide a seal assembly of the type described which resists axial, radial, and warping displacements; and which also allows decreased turbine back face clearances.

The present invention realizes the objects thereof by providing an improved seal structure for a turbine engine, said turbine engine including a housing, said housing rotatably receiving a centrifugal compressor having a rotor, said compressor inducting air via an inlet to said compressor and delivering this air pressurized to an outlet therefrom, a radial inflow turbine including a turbine rotor receiving motive fluid via an inlet of said turbine and expanding said motive fluid toward ambient to extract rotary shaft power therefrom, said compressor rotor and said turbine rotor being disposed in back-to-back relation so that inlet flow to said compressor and outlet flow from said turbine flow in a single axial direction, said turbine rotor being drivingly connected with said compressor rotor and axially spaced therefrom to define a radially inwardly and axially extending annular gap therebetween, said housing carrying and sealingly cooperating with an annular sealing member extending radially inwardly into said gap and at a radially inner extent thereof sealingly cooperating with a radially outwardly disposed cylindrical rotor surface intermediate said compressor rotor and said turbine rotor to substantially prevent air flow from the former toward the latter; said annular sealing member including a radially outer annular rim portion sealingly cooperating with said housing, a first annular wall portion extending radially inwardly and in a first axial direction from said rim portion, a second annular wall portion joining with said first annular portion and extending radially inwardly therefrom and in a second axial direction opposite said first axial direction, and a third annular wall portion joining with said second annular portion and extending radially inwardly therefrom to at its radially inner extent define a bore surface in sealing juxtaposition with said cylindrical rotor surface.

BRIEF DESCRIPTION OF THE DRAWINGS

FIG. 1 provides a schematic presentation of a turbine engine 10 embodying the present invention. In order to gain a generalized overview of the operation of the turbine engine 10, it is necessary to note that the engine 10 includes a dynamic compressor section 12 which in operation ingests ambient air, as indicated by arrow 14, and delivers this air pressurized to a combustor section 16, as is indicated by arrow 18. A flow of fuel is added to the pressurized air in combustor section 16, as indicated by arrow 20. Combustion maintained within the combustor section 16 provides a flow of high temperature pressurized combustion products. These combustion products flow to a turbine section 22 (as is indicated by arrow 24) wherein they are expanded toward ambient pressure and discharged (as is indicated by arrow 26 to produce shaft power. The turbine section 22 drives a shaft 28 which in turn drives the dynamic compressor section 12. The shaft 28 includes an externally extending portion 28' whereby the turbine engine 10 may deliver shaft power to an external power-consuming device (not shown).

Figure 1:
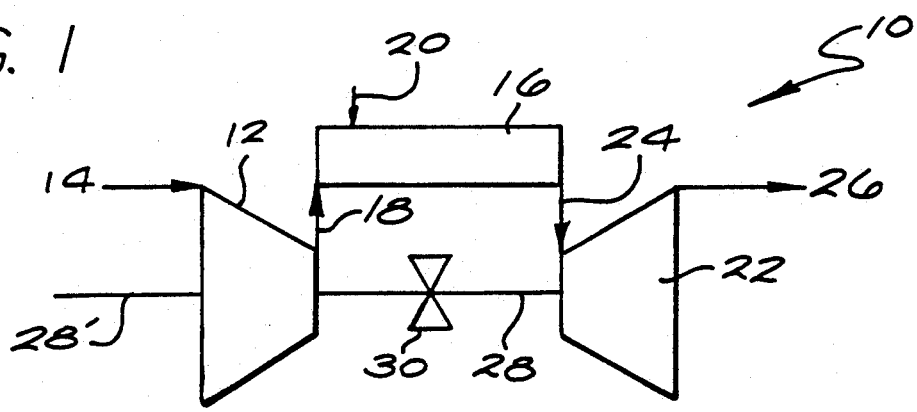
FIG. 1 presents a system schematic of a turbine engine including a seal member according to the present invention.

Between the compressor section 12 and turbine section 22, a seal apparatus 30 is disposed about the shaft 28 and cooperates therewith to substantially prevent flow of pressurized air from compressor section 12 to turbine section 22 along the shaft 28. That is, because of the seal apparatus 30, substantially all of the air pressurized by compressor section 12 flows to turbine section 22 via the combustor 16.

Figure 2:
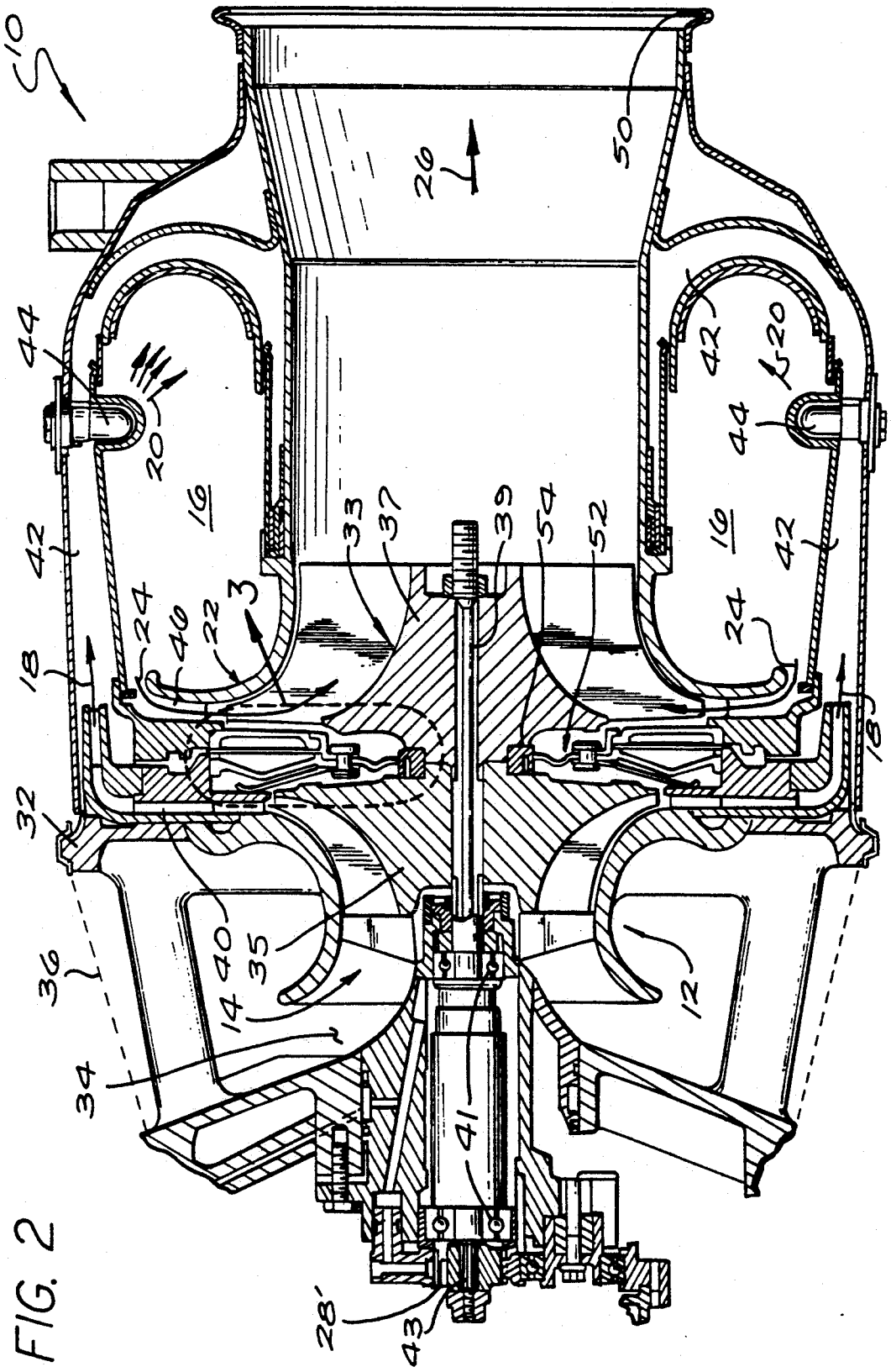
FIG. 2 provides a longitudinal cross sectional view through a turbine engine as depicted schematically in FIG. 1, and including a seal member embodying the present invention.

In viewing FIG. 2, it will be seen that the turbine engine 10 includes a housing generally referenced with the numeral 32. The housing 32 defines an inlet 34 opening to ambient air via an inlet screen 36, and through which a flow of ambient air (arrow 14) is received. The housing 32 journals a rotor member generally referenced with the numeral 33. Rotor 33 includes a compressor rotor portion 35, a turbine rotor portion 37, and an elongate tie bolt 39. Cooperatively, the portions 33, 35, tie bolt 39, and an externally extending shaft portion 28' substantially complete the rotational assembly 38 of the engine 10, recalling the schematic depiction of FIG. 1. The rotational assembly is journaled in housing 32 by a pair of angular contact bearings 41 which sustain both radial and thrust loads. At its left end, viewing FIG. 2, the shaft portion 28' includes a splined drive coupling portion 43 whereby shaft power is transferred from engine 10 to, for example, a power distribution gear box (not shown).

The compressor rotor member 35 is rotatably received in the housing 32 and receives thereon the inlet flow of ambient air 14. Rotor member 35 delivers the received air pressurized (arrow 18) via a diffuser structure 40 into a pressurized air plenum 42. The plenum 42 surrounds combustor 16, which includes outer perforate walls allowing air flow inwardly thereof from the plenum 42.

Carried by the housing 32 and extending inwardly through the plenum 42 and into combustor 16 is a plurality of fuel delivery nozzles 44, only two of which is visible viewing FIG. 2. The nozzles 44 deliver a spray of fuel (arrow 20) into the combustor 16 so that combustion is maintained therein. Combustion products flow from combustor 16 to turbine section 22 (arrow 24) via a nozzle member 46. The turbine section 22 includes the radial in-flow turbine rotor 37 which, as noted previously, is disposed in back-to-back relation with the centrifugal compressor rotor 35. The turbine rotor 37 rotatably extracts shaft power from the combustion products 24, which are then exhausted from the engine 10 via an exhaust duct opening 50 (arrow 26).

Figure 4:
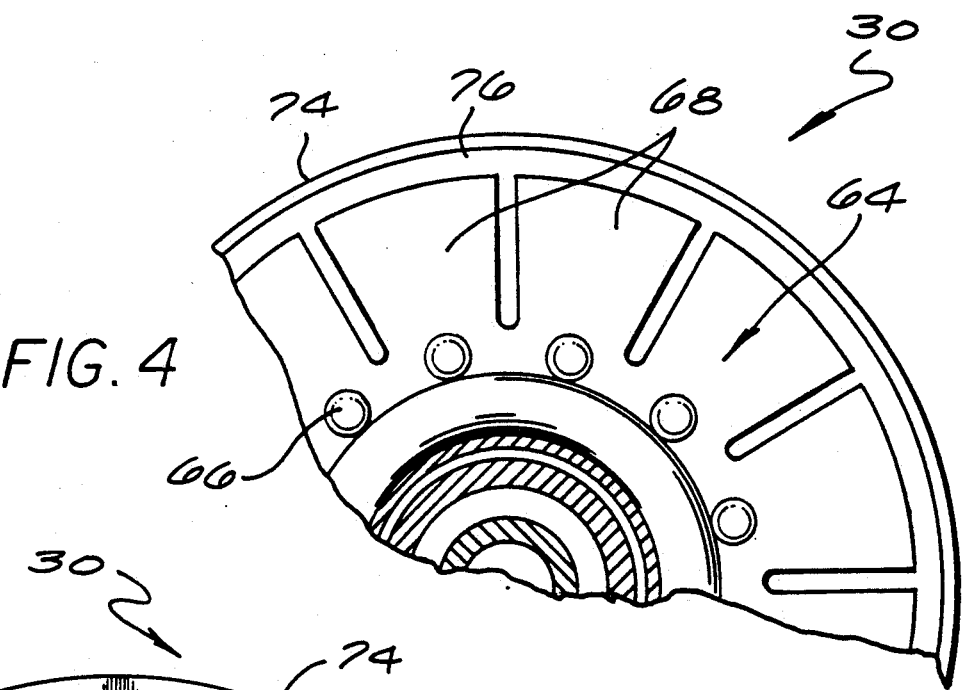
FIGS. 4 and 5 each provide respective fragmentary views of opposite axial faces of the seal member depicted in FIGS. 2 and 3.
Figure 5:
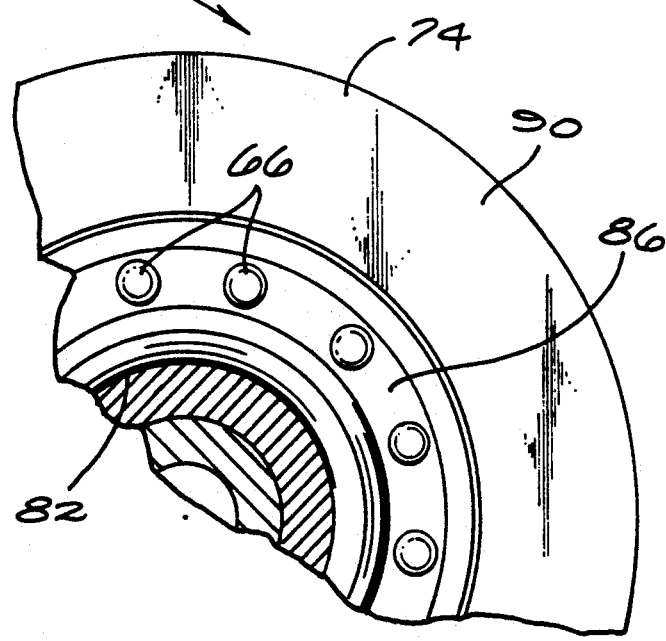
Figure 3:
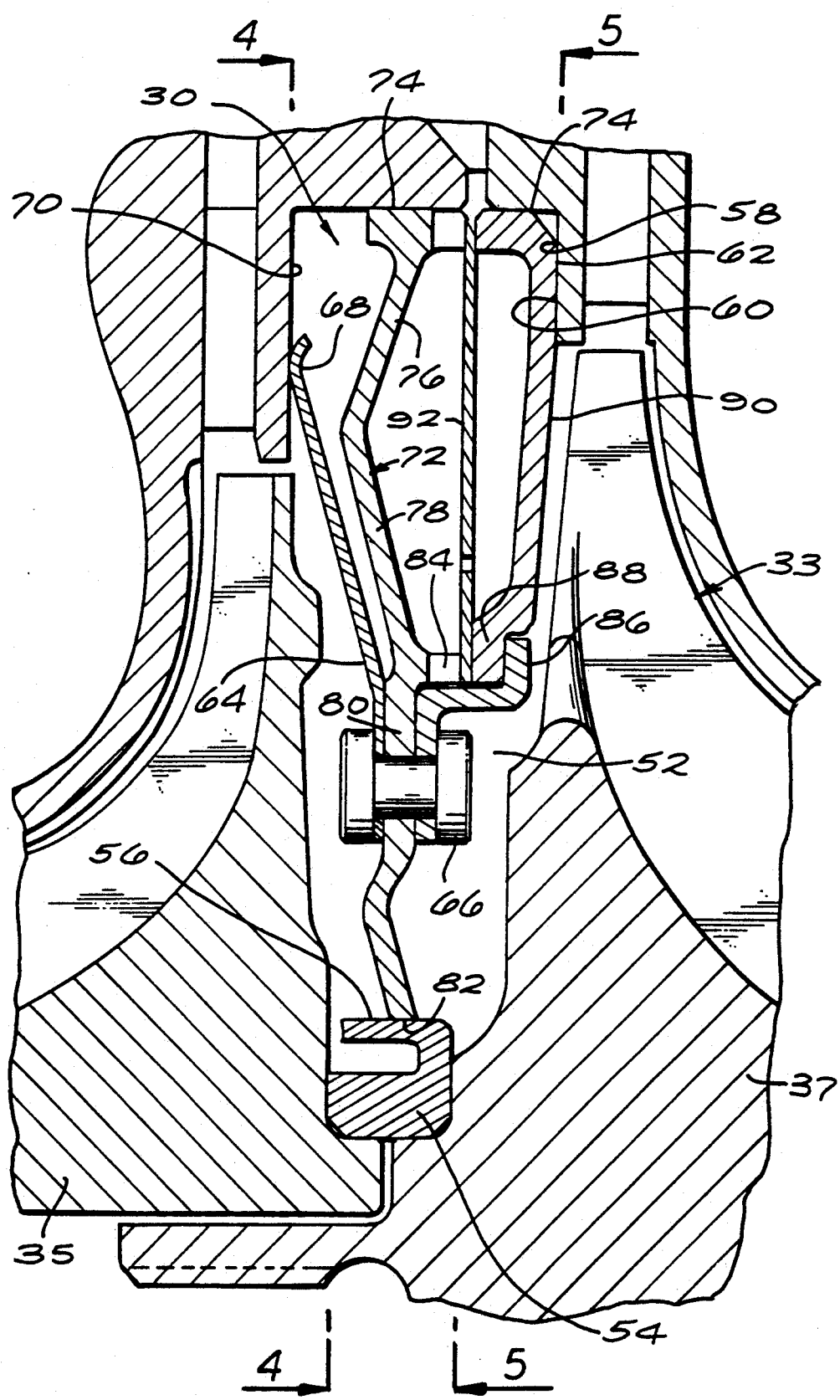
FIG. 3 provides an enlarged fragmentary longitudinal cross sectional view of an encircled portion of FIG. 2.

Viewing FIGS. 3-5, it is seen that the compressor rotor 35 and turbine rotor 37 are disposed in back-to-back relation. In other words, fluid flow approaching compressor rotor 35, and fluid flow departing turbine rotor 37 moves in the same axial direction. The rotors 35 and 37 define an inwardly extending radial groove 52 therebetween, which groove leads to and terminates at a piloting ring 54 received between the rotors 35 and 37. The piloting ring 54 assists in maintaining mutual concentricity of the rotor members 35 and 37, and also defines a radially outwardly disposed outer surface 56.

The housing 12 defines a radially inwardly disposed annular groove 58 axially between the diffuser 40 and the turbine nozzle 46. The groove 58 is axially coextensive with the groove 52 so that the two grooves 52 and 58 are radially congruent.

Carried in the groove 58 and extending radially inwardly into groove 52 is an annular seal assembly generally referenced with the numeral 30. Recalling that the source of pressurized air in the engine 10, is compressor section 12, it is apparent that seal assembly 30 is exposed on its left face to pressurized air from compressor 32, and is exposed on its right face to lower pressure, but higher temperature, combustion products from combustor 16. Consequently, the seal assembly 30 at an axially disposed radially outer marginal annular face 62 thereof is pressure biased axially into sealing engagement with the housing 32 at an axially disposed annular shoulder 60 of groove 58.

In order to resiliently bias the seal assembly 30 toward the shoulder 60, the assembly 30 includes an annular spring member 64. The spring member 64 is disposed on the cool side of seal assembly 30 toward compressor 12, and is attached at its radially inner margin to the assembly 30 by a plurality of rivets 66. The spring member 64 may be circumferentially continuous like a Belleville spring, or may include, as depicted, a plurality of resilient finger portions 68, only one of which is visible on FIG. 3. The spring member 64 extends radially outwardly to engage a shoulder 70 of housing groove 58, which shoulder 70 is disposed axially opposite to shoulder 60.

Importantly, the seal assembly 30 includes an annular wall member, generally referenced with the numeral 72. At its radially outer margin, the wall member 72 includes an axially thickened rim portion 74 which is received closely but axially movably in the groove 58. Extending radially inwardly from the rim portion 74, the wall 72 includes a radially outer first annular wall portion 76 which is conical to extend in a respective first axial direction toward the compressor 12. The wall portion 76 joins at its radially inner extent with a second annular wall portion 78 which is also conical but extends radially inwardly and in an axial direction opposite to the wall portion 76.

At its radially inner extent, the wall portion 78 joins with a third radially inwardly extending wall portion 80. The wall portion 80 is generally of truly-radial configuration in contrast to the two successively radially disposed conical portions 76 and 78 of the wall member 72. At its radially inner extent, the wall portion 80 terminates in a radially disposed annular surface 82, which surface is disposed in close radially spaced running relationship with the outer surface 56 of the pilot ring 54. In other words, the wall member 72 at its radially inner termination does not actually touch the radially outer surface 56 of ring 54, but preferably maintains a sufficiently close running clearance therewith that leakage flow of pressurized air from compressor section 12 to turbine section 22 is controlled to an acceptable level.

Near the junction of wall portions 78 and 80, the wall member 72 defines an axially extending flange 84. The flange 84 cooperates with an annular bracket member 86, which is secured to wall member 72 by rivets 66 on the face thereof opposite spring 68, to define a radially outwardly disposed annular recess 88. Received captively and movably in the recess 88 (and, in the groove 58 between the wall member 72 and shoulder 60) is an annular turbine back face shroud member 90. The turbine back face shroud member 90 defines annular face 62 of the seal assembly 30, and is somewhat radially movable relative to both the housing 32 and the remainder of seal assembly 30 to allow differential thermal movements therebetween.

A relatively thin radiant heat shield 92 is captively received between the turbine back face shroud 90 and the wall member 72. The radiant heat shield 92 at its radially inner extent is captured movably between the flange portion 84 of wall 72 and the radially inner extent of the turbine back face shroud member 90. Consequently, both the turbine back face shroud member 90 and the radiant heat shield member 92 are relatively movably captured and carried by the wall member 72.

Having observed the structure of seal assembly 30, attention may now be directed to the advantageous operation of this seal structure in a turbine engine of the type disclosed. As noted earlier, during operation of the turbine engine 10, the seal assembly 30 is subject on its left side to a higher fluid pressure than on its right side. This fluid pressure differential loading tends to bow the wall member 72 rightwardly relative to rotors 35 and 37. Also, the rotational assembly 33 of the engine 10 is subject to axial movements relative to the housing 32 as the engine experiences start up and load cycling. Consequently, axial clearance existing between the wall member 72 adjacent the pilot ring 54 and the axially disposed faces of the rotors 35 and 37 is at risk of being eliminated so that rubbing therebetween may occur.

In addition, the seal assembly 30 is not necessarily heated with circumferential uniformity from its side adjacent turbine rotor 37, nor cooled circumferentially uniformly from the compressor side. Thus, the seal assembly may attempt to warp due to this nonuniform circumferential temperature distribution. Superimposed upon this nonuniform circumferential temperature distribution is an inherent radial temperature gradient within the seal structure 30 having its highest temperature about at the radially inner margin of the turbine nozzle 46, and decreasing both radially inwardly and radially outwardly therefrom. That is, there exists in the seal assembly 30 both radial and circumferential temperature gradients.

All of these factors combine to cause the bowing, buckling, and resulting seal rubbing which is discussed above with respect to conventional known seal structures. However, the seal structure 30 is well able to resist these influences so that rubs between the seal and one or the other of the compressor rotor 35 or turbine rotor 37 do not occur. That is, the wall member 72 including as it does the radially nested conical wall portions extending from rim 74 to sealing surface 82 resists bowing in response to the fluid pressure differential thereacross. The turbine back face shroud member 90 is itself relatively massive so that the effect of circumferentially nonuniform heat input to this member is minimized. Also, the member 90 is "floatingly" supported (or is freely movable within limits) relatively to the wall member 72, with an allowed relative motion which exceeds the differential thermal expansions experienced in practice. Thus, the physical excursions of the turbine back face shroud 90 are isolated from wall 72. Finally, the radiant shield 92 further isolates the wall member 72 from the effects of the circumferentially and radially varying heat input to and temperature of the member 90, as these effects might otherwise be radiantly transmitted to the wall member 72. The result of all of the above is the maintenance of clearances between the turbine back face shroud member 90 and the turbine rotor 37 which are closer than are permissible with conventional seal structures. This reduced clearance at the turbine rotor 37 results in improved turbine efficiency and power output for the engine 10, as well as on improved specific fuel consumption.

What is claimed is:

1. A seal structure for a turbine engine, said turbine engine including a housing surrounding a centrifugal compressor having a rotor, and a radial inflow turbine including a turbine rotor, said compressor rotor and said turbine rotor being disposed in back-to-back relation, said turbine rotor being drivingly connected with said compressor rotor and axially spaced therefrom to define an annular gap therebetween, said gap radially bounded at its outer periphery by said housing and at its inner periphery by an annular surface intermediate said compressor rotor and said turbine rotor an annular sealing member disposed in said gap to control air flow from said compressor toward said turbine; said annular sealing member including a first outer annular rim portion sealingly cooperating with said housing, a first conical annular wall portion extending inward from said rim portion and in a first axial direction rom said rim portion, a second conical annular wall portion joining with said first annular wall portion and extending inward therefrom and in a second axial direction opposite said first axial direction, and a third annular wall portion joining with said second annular wall portion and extending inward therefrom towards said surface intermediate said compressor rotor ad said turbine rotor, and biasing means cooperating with said housing for urging said seal structure toward said turbine rotor.

2. The invention of claim 1 further including a turbine back face shroud member including a second outer rim portion generally coextensive with said first outer rim portion, said turbine back face shroud member including an annular portion extending inward from said second outer rim portion and in axially spaced relation with both an axially disposed back face surface of said turbine rotor and said first and second annular wall portions of said sealing member, and means for axially constraining said turbine back face shroud member relative to said sealing member while permitting radial, thermal expansion of said shroud member.

3. The invention of claim 2 wherein said constraining means is proximate the junction of said second the third annular wall portions of said sealing member and an inner portion of said turbine back face shroud member.

4. The invention of claim 3 wherein said constraining means includes an annular bracket member secured to said sealing member and in cooperation with a flanged surface of said sealing member defining an outward opening annular recess, said inner portion of said turbine back face shroud member being slideably receiving in said recess.

5. The invention of claim 2 further including an annular heat shield member axially disposed between said first and second wall portions and said turbine back face shroud member.

6. The invention of claim 5 wherein said annular heat shield member includes a radially outer marginal portion and a radially inner marginal portion, each of said marginal portions slideably engaging axially adjacent surfaces of said sealing member and said turbine back face shroud member for relative radial movement therebetween.

7. The invention of claim 1 wherein said biasing means includes a resilient annular spring member secured to said sealing member adjacent the juncture of said second and third annular wall portions, said annular spring member extending radially outward from said juncture and in said first axial direction in axially spaced and substantially parallel relation with said second conical annular wall portion of said sealing member.

* * * * *